US008749667B2

(12) United States Patent
Noraz et al.

(10) Patent No.: US 8,749,667 B2
(45) Date of Patent: Jun. 10, 2014

(54) SYSTEM AND METHOD FOR MAINTAINING MAXIMUM INPUT RATE WHILE UP-SCALING AN IMAGE VERTICALLY

(75) Inventors: Frederic J. Noraz, Gattieres (FR); Shashank Dabral, Bangalore (IN); Stephen Busch, Grasse (FR)

(73) Assignee: Texas Instruments Incorporated, Dallas, TX (US)

( * ) Notice: Subject to any disclaimer, the term of this patent is extended or adjusted under 35 U.S.C. 154(b) by 265 days.

(21) Appl. No.: 12/971,675

(22) Filed: Dec. 17, 2010

(65) Prior Publication Data
US 2012/0026367 A1 Feb. 2, 2012

(30) Foreign Application Priority Data

Aug. 2, 2010 (EP) ..................................... 10290435

(51) Int. Cl.
*H04N 5/262* (2006.01)
(52) U.S. Cl.
USPC ................................ 348/240.99; 348/231.99
(58) Field of Classification Search
USPC .......................................... 348/231.99, 240.99
See application file for complete search history.

(56) References Cited

U.S. PATENT DOCUMENTS

| 7,876,976 B2 * | 1/2011 | Cho et al. ....................... 382/276 |
| 2004/0189566 A1 * | 9/2004 | Nakamura et al. ............... 345/87 |
| 2005/0248596 A1 * | 11/2005 | Smith et al. .................... 345/698 |
| 2008/0303948 A1 * | 12/2008 | Honma ........................... 348/569 |

* cited by examiner

*Primary Examiner* — Gevell Selby
(74) *Attorney, Agent, or Firm* — Ronald O. Neerings; Wade James Brady; Frederick J. Telecky, Jr.

(57) ABSTRACT

An example embodiment provides a resizer in an image processing system. The resizer includes a receiving module that receives pixel data representative of an image. A triple line buffer is coupled to the receiving module that stores the pixel data in response to a write control signal from control logic. The triple line buffer is operated as a circular buffer. The resizer further includes a resizer core that reads pixel data from the triple line buffer in response to a read control signal from the control logic. The pixel data is replicated to up-scale the image vertically according to a vertical up-scale ratio such that the resizer achieves a maximum input data rate and also eliminates an overflow condition in the resizer. The vertical up-scale ratio is a fraction.

23 Claims, 3 Drawing Sheets

SYSTEM AND METHOD FOR MAINTAINING MAXIMUM INPUT RATE WHILE UP-SCALING AN IMAGE VERTICALLY

TECHNICAL FIELD

Embodiments of the disclosure relate to up-scaling a source image to create a destination image in an imaging device.

BACKGROUND

The resizer is used in imaging devices, for example, portable media devices or digital cameras, for changing the image resolution between a source and a destination. The resizer can be used to either up-scale the image thereby allowing the user to achieve digital zoom or down-scale the image for effectively displaying a large format image on a much smaller resolution LCD panel or for achieving a smaller resolution image for further processing. Digital image includes a two dimensional array of pixels. A horizontal array of pixels is referred to as a line. The output interface of the resizer can support a maximum data rate of for example, 200 Megapixels (Mpix)/cycle. While this easily translates to an input data rate of 200 Mpix/cycle while down-scaling, the maximum input rate is reduced during up-scaling as each input pixel/line leads to multiple output pixels/lines. Thus, the input data rate during up-scale is variable and depends on the up-scale ratio of the horizontal and vertical direction. The equation given below defines the maximum input rate that can be achieved during up-sampling:

$$\text{Input clock} <= 200 \text{ Mhz}/[(\text{Horizontal up-scale ratio} * \text{Vertical up-scale ratio})] \quad \text{Equation 1}$$

Thus for example, if the horizontal and vertical up-scale ratios are fixed to 2×, then the maximum rate that can be achieved on the input is 200/(2*2)=50 Mhz. The equation 1 derives from the fact that, during 2× up-scale, each input pixel will result in 2 output pixels in the horizontal direction, and each input line will result in 2 output lines in the vertical direction. Thus if the output rate is clipped at 200 Mpix/cycle, only 50 Mpix/cycle can be supported at the input side if the overall up-scaling ratio is 4×.

Although, functionally any input clock (as defined by the above equation) will suffice, it's always necessary to maximize the input clock to have the best performance. Lower data rate also means that it will require more time to generate the output image and hence performance is downgraded. The target is to be able to achieve a data rate of 200 MPix/cycle even though digital zoom with fractional values is used.

Further, the performance constraints are easily met when there is up-scale only in the horizontal direction or up-scale in the vertical direction (along with horizontal) with the vertical up-scale ratio being an integer. However, certain complexities may arise when the vertical up-scale ratio is a fraction and the impact this can have on the performance of the resizer. For example, consider a case when the horizontal rescale ratio is '1×' and the vertical rescale ratio is '1.1×'. In this case the resizer cannot generate 1.1 lines for every incoming line, instead for every 10 input lines, 11 output lines are generated. The resizer generates 1 output line per incoming line, till the difference in floor function of the new and old vertical ratio becomes equal to 2. Once this condition is met, the resizer generates 2 output lines corresponding to that input line. In the subsequent lines, resizer again generates 1 output line per input line and the pattern repeats.

A direct consequence of this irregular output pattern is the fact that the input pixel clock now needs to run much slower than the 181 Mhz (200/1.1) as governed by equation 1. The reason being that the output port of the resizer can at most produce data at the rate of 200 Mpix/cycle. For the case when the resizer is outputting 2 lines for the corresponding input line, the maximum input rate that can be sustained is only 100 Mpix/cycle. Since the input rate corresponds to the speed at which data is being read from the sensor, it has to stay constant throughout the frame. As such, even in the cases when the resizer is generating only one output line/input line, the input data rate will be 100 Mpix/cycle. Thus in this case the desired input rate is 81% faster than the actual rate.

SUMMARY

An example embodiment provides a resizer in an image processing system. The resizer includes a receiver that receives pixel data representative of an image, a triple line buffer is coupled to the receiver that stores the pixel data in response to a write control signal from a control logic, the triple line buffer operating as a circular buffer. The resizer further includes a resizer core that reads pixel data from the triple line buffer in response to a read control signal from the control logic. The pixel data is replicated to up-scale the image vertically according to a vertical up-scale ratio. The vertical up-scale ratio is a fraction, such that the resizer achieves a maximum input data rate and also eliminates an overflow condition in the resizer.

An example embodiment provides an image processing system. The image processing system includes a sensor that captures an image; a receiver coupled to the sensor that receives pixel data representative of an image. A triple line buffer is coupled to the receiver that stores the pixel data in response to a write control signal from a control logic. The triple line buffer operates as a circular buffer. The image processing system further includes a resizer core that includes an input synchronizer logic that synchronizes an output of the triple line buffer between a plurality of rescaler engines. The plurality of rescaler engines reads pixel data from the triple line buffer in response to a read control signal from the control logic. The pixel data is replicated to resize the image. Each of the rescaler engines comprises horizontal and vertical resize ratios as at least one of an integer and a fraction, and the resize ratios being irrespective of each other.

An example embodiment provides a method for use in an image processing system. Pixel data representative of an image is received. The pixel data is then stored in a memory in response to a write control signal from a control logic. The triple line buffer is operated as a circular buffer. Further, pixel data is read from the triple line buffer in response to a read control signal from the control logic, the pixel data being replicated to up-scale the image vertically according to a vertical up-scale ratio, the vertical up-scale ratio being a fraction, such that the resizer achieves a maximum input data rate and also eliminates an overflow condition in the resizer.

Other aspects and example embodiments are provided in the Drawings and the Detailed Description that follows.

BRIEF DESCRIPTION OF THE VIEWS OF DRAWINGS

Figure 5:
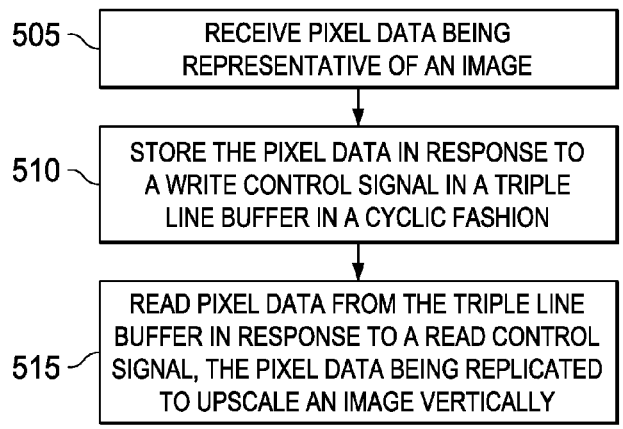
Figure 4:
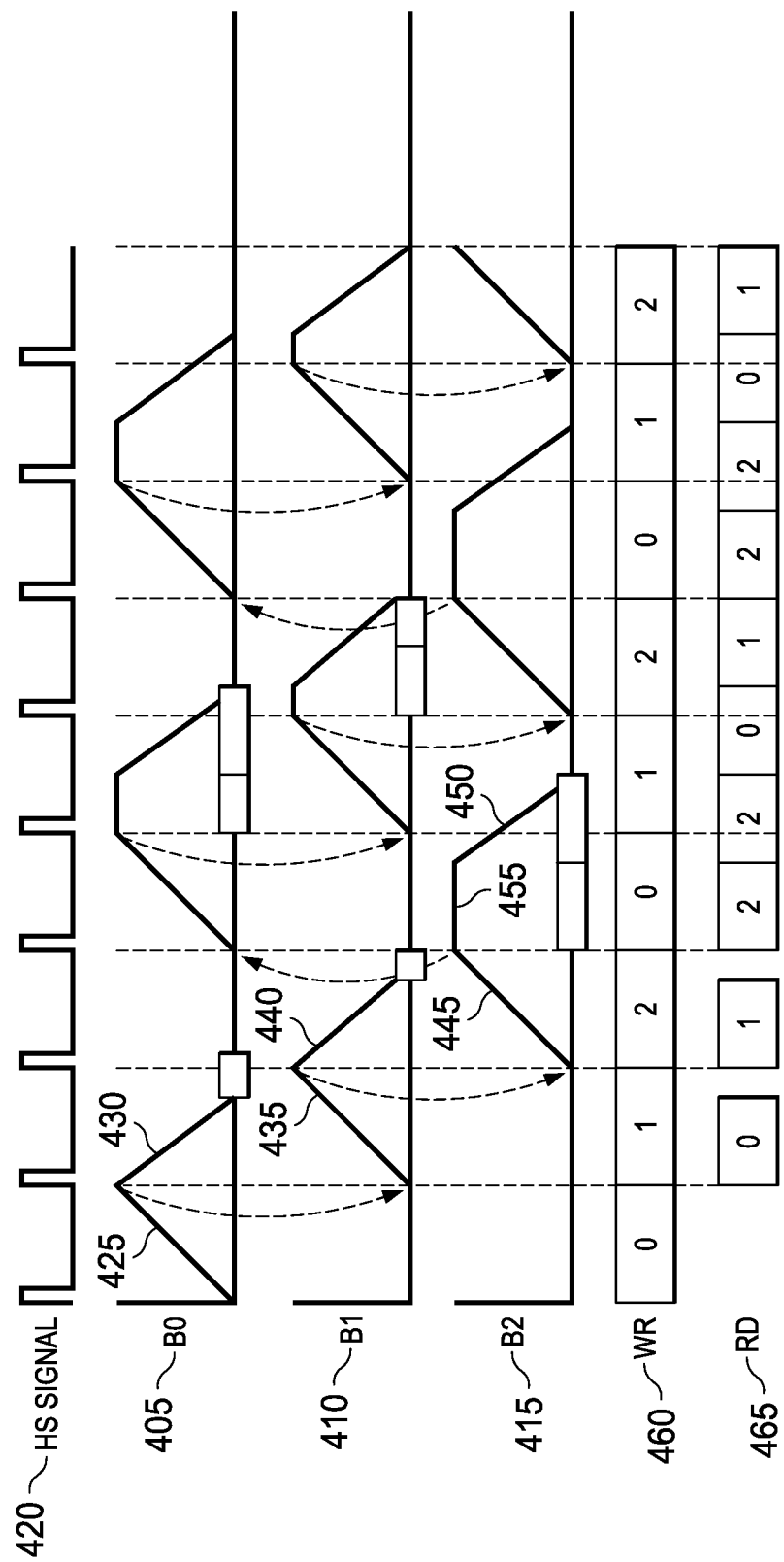

FIG. 4 graphically illustrates operation of the triple line buffer according to an embodiment; and FIG. 5 is a flow diagram according to an embodiment.

DETAILED DESCRIPTION OF THE EMBODIMENTS

Several embodiments described herein provide a resizer in an image processing system that achieves maximum theoretical input data rate irrespective of the vertical up-scale ratio. Up-scaling an image includes up-scaling the image frames completely or a portion of the image. In various embodiments, the vertical up-scale ratio is either an integer or a fraction. The image processing system is implemented between a source and a destination. In several embodiments, the source may be but not limited to, an image sensor, another image processing subsystem and a memory. Similarly, the destination may be, but not limited to an LCD screen, video CODEC, memory and an image processing subsystem. In one embodiment, the resizer includes a triple line buffer at the input of the resizer before an interpolator stage. The triple line buffer includes three memory lines that are used in a circular fashion. In other words, the triple line buffer is implemented as a circular buffer. The 'circular buffer management' enables maximum utilization of the line buffers while ensuring the lowest area. Furthermore, the triple line buffer smoothens the data bandwidth requirements at an interpolator in the image processing system thereby ensuring that sufficiently high and deterministic input data rate can be maintained irrespective of the vertical up-scale ratio.

The operation and implementation of several embodiments can be better understood from an explanation of the underlying principles of up-scaling an image. Up-scaling refers to increasing the resolution of a given input image such that the output image has larger number of pixels in every line as well as larger number of lines of pixels compared to the input image. A practical application of up-scaling could be, for example, to achieve digital zoom in digital cameras. Up-scaling is generally achieved by creating new pixels by performing interpolation on the existing pixels according to the up-scale ratio. Up-scale ratio is defined as the ratio of the output size to the input size of the image. In a given implementation, the output rate is fixed to a predetermined value and the input rate is dependant on the output rate as well as the up-scaling ratio. While up-scaling, each input pixel is used to create multiple output pixels. As such the rate at which the input pixels are coming (input data rate) needs to be slower than the rate at which the output pixels are being evacuated (output data rate). The ratio of the output rate to the input rate is governed by and is equal to the up-scaling ratio.

Figure 1:
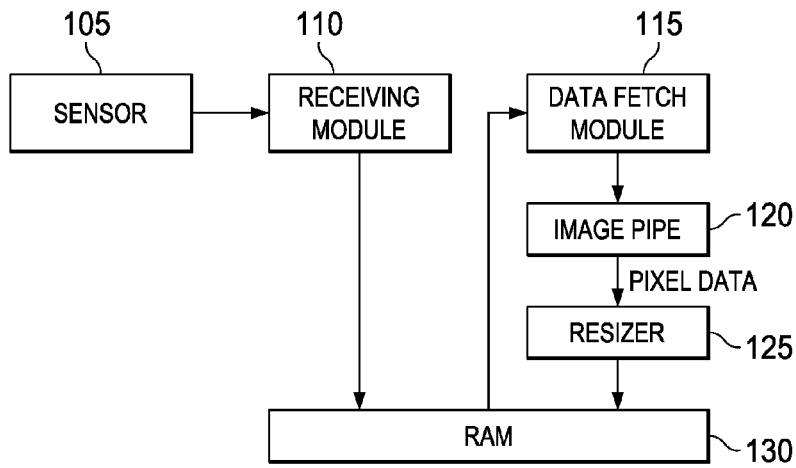
FIG. 1 illustrates a block diagram of an environment where several embodiments may be implemented.

An example of an image processing system is illustrated in FIG. 1. The image processing system uses 4 tap horizontal and vertical filters for resealing in each of these directions respectively. FIG. 1 particularly illustrates the data flow of the resizer 125 when incorporated in an image processing subsystem. The receiver 110 interfaces with the sensor 105 and receives captured image. The receiving module 110 further stores the captured image in a random access memory (RAM) 130, for example synchronous dynamic RAM (SDRAM). If the image is being up-scaled, the receiving module 110 may optionally crop the incoming image to only store the valid area of the image. The stored image is then fetched for processing by the data fetch module 115. The stored image further passes through the image pipe 120 before reaching the resizer 125. The resizer 125 receives pixel data and performs up-scaling of the image. The up-scaled image is then again stored in to the RAM by the resizer 125.

Problem of sustaining sufficiently high throughput while up-scaling an image vertically as identified can be solved by adding sufficient number of full line size buffers such that the peak slowdown is absorbed. Peak slowdown occurs when the resizer 125 produces multiple outputs from a single input line and the number of output lines created corresponding to each input line is equal to the smallest integer greater than or equal to the up-scale ratio. Each of the line buffers required for this embodiment are 5376 pixels (16 bit) wide and thus represent approximately 86 Kb of storage. As such it is imperative to correctly identify the minimum number of such buffers which will enable the resizer 125 to meet the required input data rate for all possible values of vertical up-scale ratio. In effect, the extra buffering provided by the triple line buffer smoothens out the memory bandwidth requirements, such that an overflow never occurs. Overflow may be defined as an event when all the buffers in the triple line buffer are completely full and new pixel data arrives at the input port of the triple line buffer. The resizer 125 including the triple line buffer is illustrated in FIG. 2.

Figure 2:
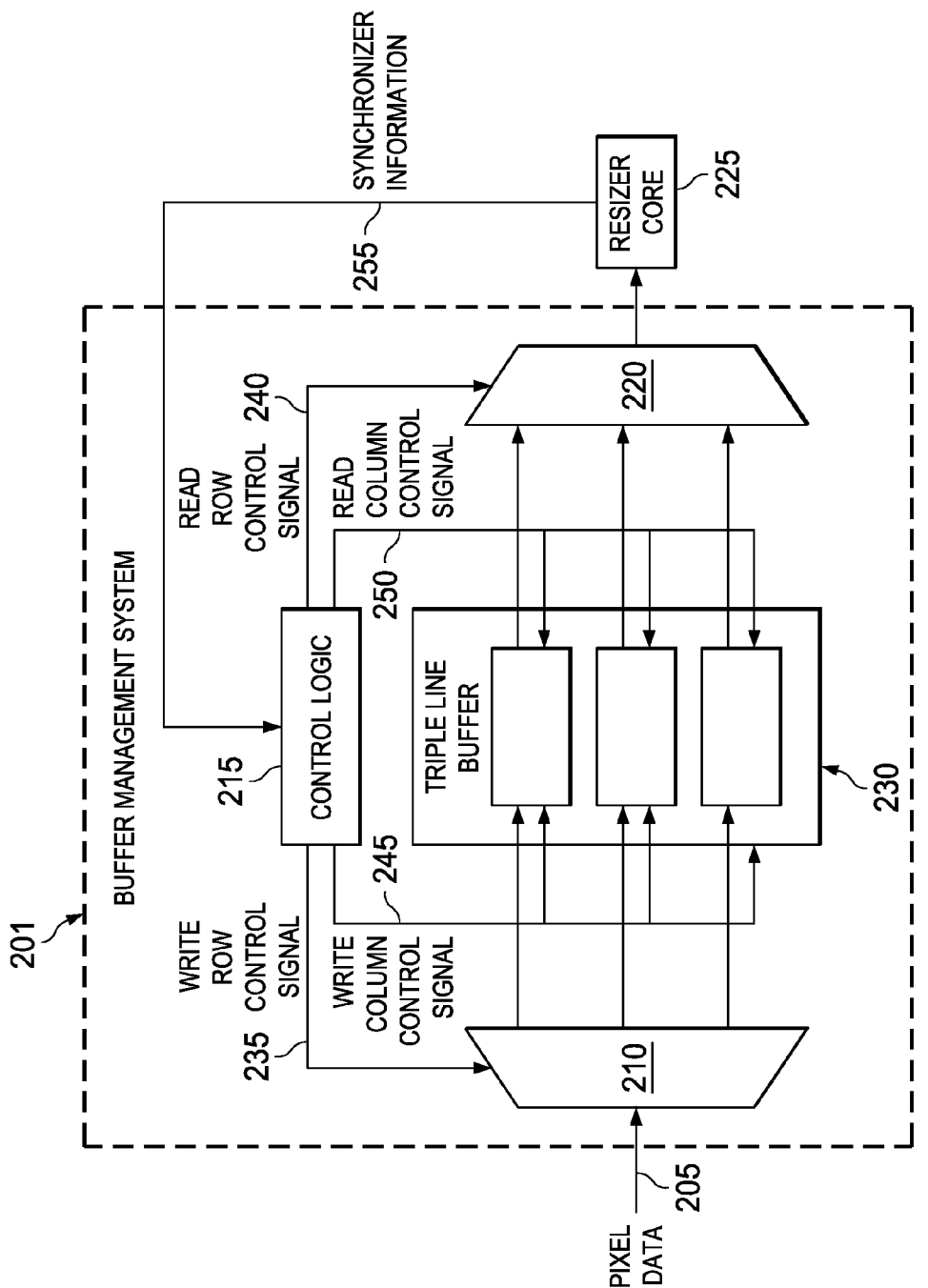
FIG. 2 illustrates a block diagram of a resizer according to an embodiment.

Referring now to FIG. 2 the resizer 125 according to an embodiment is illustrated. The resizer 125 includes a buffer management system 201 and a resizer core 225 which performs the resealing (up-scaling in this case) operation. The buffer management system includes a de-multiplexer 210 that receives pixel data on a line 205 and a triple line buffer 230 connected at a dc-multiplexer output. Pixel data can be received from either a sensor or another image processing stage. Each line of the triple line buffer 230 includes a single port memory. Output of the triple line buffer 230 is provided to a multiplexer 220. An output of the multiplexer 220 is connected to a resizer core 225. The buffer management system 230 further includes a control logic 215 that generates a plurality of control signals using synchronization information from the resizer core 225 that is provided to the de-multiplexer and multiplexer. The plurality of control signals include two write control signals namely a write row control signal 235, the write column control signal 245; and two read control signals namely the read row control signal 240 and the read column control signal 250. The control logic can be programmed to generate the control signals.

The de-multiplexer 210 routes the pixel data 205 to one of the line buffers of the triple line buffer 230 depending on the value of the write row control signal 235. The de-multiplexer output is provided selectively to each line buffer of the triple line buffer. The triple line buffer 230 writes and reads data from one of the memory lines depending on the write column control signal 245 and the read column control signal 250.

The triple line buffer 230 uses a circular buffer management technique to support maximum input data rate. The pixel data is written into one of the buffers starting from the first location till the last location and then moving on to the next buffer in a cyclic fashion. Similarly, the pixel data is read from the line buffer in which the write has previously been performed. The multiplexer 220 receives a buffer output of the triple line buffer 230 and the read row control signal 240, and generates a multiplexer output which is provided to the resizer core 225. Multiplexer 220 selects one of the line buffers from the triple line buffer 230 depending on the value of the read row control signal 240. The resizer core 225 reads pixel data from the triple line buffer 230 in response to a read column control signal 250 from the control logic. The pixel data is replicated to up-scale the image vertically according to a vertical up-scale ratio. As noted before, the vertical up-scale ratio is a fraction.

In addition to supporting theoretically maximum input data rate for all values of the vertical up-scale ratio, the resizer 125 has an addition complexity that it has to support two instances of the resizer core (two instances of the resizer core 225 is hereinafter referred to as rescaler engines 310 and 315). A typical use case scenario for this could be generating a full resolution image for storing in the memory and generating another down-scaled version of the same image for either displaying on the LCD screen or for use in other data intensive algorithms like face detection. There could be potential use cases wherein both the images may be an up-scaled version of the original image, rather than one being an up-scaled version and the other being a down-scaled one.

Due to the use scenarios described above, each of the rescaler engines can have its own horizontal and vertical resize-ratio, programmed irrespectively of the other. As such each engine is required to support a different input data rate depending on its configuration. An obvious solution to this problem is to add another set of circular buffers for the second rescaler engine. However, the area penalty associated with the circular buffer is significant (3 lines of 5376×16 bits) and as such this scheme is not the best solution. This problem can be overcome by adding a pixel input synchronizer logic 305 between the two rescaler engines, which enables the use of two engines with the help of just one triple line buffer. The maximum input rate in this case is determined by the slower of the two rescaler engines (310 and 315), i.e. the one with the larger vertical up-scale ratio. The slower rescaler engine stalls the faster rescaler engine to ensure that their inputs are always synchronized with each other. The read from the triple buffer thus moves forward only when both the rescaler engines need to fetch the next line. This scheme provides acceptable performance while saving the area overhead of an extra set of line buffers. The aforesaid embodiment is explained in detail in conjunction with the explanation of FIG. 3.

Figure 3:
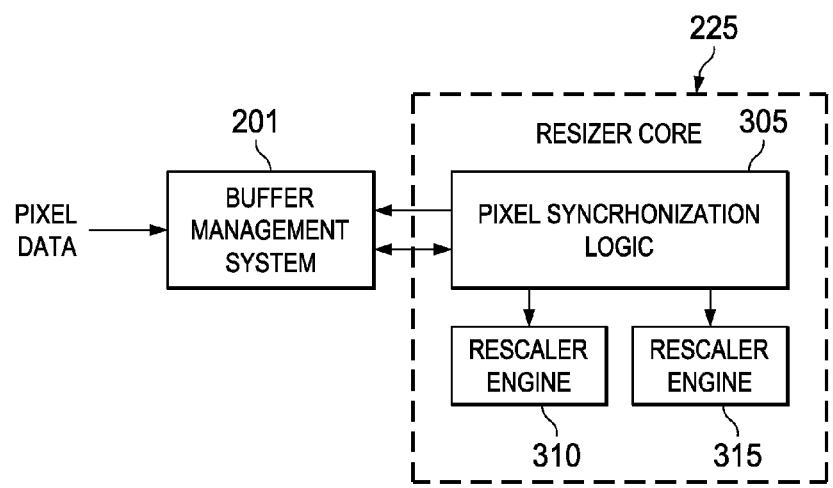
FIG. 3 illustrates a block diagram of a resizer according to another embodiment.

Referring now to FIG. 3, the buffer management system 201 and a digital system 225 is illustrated. The digital system 225 includes a pixel synchronizer logic 305 and two instances of the rescaler engine 310, 315. An output of the buffer management system 201 is connected to the pixel synchronizer logic 305. An output of the pixel synchronizer logic 305 is connected to each of the rescaler engines 310, 315. It is noted that each one of the rescaler engines 310,315 operates at an independent input data rate. Operation of the buffer management system 201 is the same as explained above. The pixel synchronizer logic 305 ensures that the inputs of both the rescaler engines 310, 315 are synchronized by stalling the input to the faster one of the rescaler engines 310 or 315 as required. It is noted that this embodiment is explained using vertical upscale as an example, the pixel synchronizer logic 305 along with the triple line buffer 230 can be extended to resize an image either vertically or horizontally.

The circular buffer management in the triple line buffer 230 is explained now. FIG. 4 illustrates the buffer levels in the triple line buffer 230 with the symbols B0 405, B1 410 and B2 415 representing the levels of each one of the three buffers in the triple line buffer 230. The HS signal 420 indicates the start of a new line of image data, wherein every clock after the HS signal 420 includes a valid pixel data. The WR signal 460 indicates the line buffer to which the current pixel data is being written (stored). The RD signal 465 indicates the line buffer from which the pixel data is being read. The rising slope in the graph 425 indicates buffer B0 405 filling up. Similarly, the rising slopes 435,445 indicate the buffers B1 410 and B2 415 filling up. The falling slopes 430,440 and 450 indicate the buffer levels going down and the buffers being read. The steady buffer level 455 indicates that this particular buffer will be read in plurality.

When pixel data is received by the triple line buffer 230, the data fills up the first buffer and is indicated by the rising slope 425. Once the first buffer is completely full, the resizer core 225 can start reading the data and the buffer levels decrease as indicated by the falling slop 430. At the same time the new pixel data starts filling up the second buffer as indicated by the rising slope 435. Once the second buffer is full, the data read from that starts happening as is indicated by the falling slope 440. The buffer movement thus occurs in a cyclic manner. When the resizer core 225 is repeating a line, the buffer level remains constant as indicated by the steady level 455. The three line buffers ensure that the occurrence of steady level due to line repetition never causes data overflow.

FIG. 5 illustrates a flow diagram according to an embodiment. At step 505, pixel data representative of an image is received from a source. The pixel data is stored in a triple line buffer (230) in response to a plurality of write control signals (write row control signal 235 and write column control signal 245) generated from a control logic (215) at step 510. The pixel data is first stored into one of the line buffers of the triple line buffer starting from the first location to the last location. Further the pixel data is stored in a subsequent line buffer in a cyclic fashion. Then, at step 515, pixel data is read form the triple line buffer in response to a plurality of read control signals (read row control signal 240 and read column control signal 250). The pixel data is read from the line buffer in which pixel data is previously stored. Further the resizer core proceeds to read from a subsequent line buffer in a cyclic fashion. When the pixel data is read from the triple line buffer (230), the data is replicated to up-scale an image vertically according to the up-scale ratio. In a particular embodiment, the up-scale ratio is a fraction. In one embodiment, the method illustrated in FIG. 5 can be extended to up-scale and image vertically when there is a plurality of instances of the resizer core (as illustrated in FIG. 3) using a synchronization logic (305).

In the foregoing discussion, the term "connected" means at least either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:
1. A resizer in an image processing system comprising:
a triple line buffer that stores pixel data representative of an image in response to a write control signal from a control logic, the triple line buffer operating as a circular buffer;
a resizer core that reads pixel data from the triple line buffer in response to a read control signal from the control logic, the pixel data being replicated to up-scale the image vertically according to a vertical up-scale ratio, the vertical up-scale ratio being a fraction, such that the resizer achieves a maximum input data rate and also eliminates an overflow condition in the resizer; and a de-multiplexer that receives the write control signal and pixel data, and that generates a de-multiplexer output which is provided selectively to each line buffer of the triple line buffer.

2. The resizer of claim 1 further comprising a receiving module that receives pixel data that is coupled to a receiving module.

3. The resizer of claim 2, wherein the receiver interfaces with at least one of a sensor, another image processing system and a memory to receive the pixel data.

4. The resizer of claim 1, wherein each line buffer of the triple line buffer comprises a single port memory.

5. A resizer in an image processing system comprising:
a triple line buffer that stores pixel data representative of an image in response to a write control signal from a control logic, the triple line buffer operating as a circular buffer;
a resizer core that reads pixel data from the triple line buffer in response to a read control signal from the control logic, the pixel data being replicated to up-scale the image vertically according to a vertical up-scale ratio, the vertical up-scale ratio being a fraction, such that the resizer achieves a maximum input data rate and also eliminates an overflow condition in the resizer; and
a multiplexer that receives a buffer output of the triple line buffer and the read control signal, and that generates a multiplexer output which is provided to the resizer core.

6. The resizer of claim 1, wherein the resizer core stores an up-scaled image in a memory.

7. The resizer of claim 1, wherein the pixel data is stored into one of the line buffers of the triple line buffer starting from the first location to the last location and then proceeds to a subsequent line buffer in a cyclic fashion.

8. The resizer of claim 7, wherein the pixel data is read from the line buffer in which pixel data is previously stored and then proceeds to read from a subsequent line buffer in a cyclic fashion.

9. The resizer of claim 5 further comprising a receiving module that receives pixel data that is coupled to a receiving module.

10. The resizer of claim 9, wherein the receiver interfaces with at least one of a sensor, another image processing system and a memory to receive the pixel data.

11. The resizer of claim 5, wherein each line buffer of the triple line buffer comprises a single port memory.

12. The resizer of claim 5, wherein the resizer core stores an up-scaled image in a memory.

13. The resizer of claim 5, wherein the pixel data is stored into one of the line buffers of the triple line buffer starting from the first location to the last location and then proceeds to a subsequent line buffer in a cyclic fashion.

14. The resizer of claim 13, wherein the pixel data is read from the line buffer in which pixel data is previously stored and then proceeds to read from a subsequent line buffer in a cyclic fashion.

15. An image processing system comprising:
a sensor that captures an image;
a receiving module coupled to the sensor that receives pixel data representative of the image;
a triple line buffer coupled to the receiving module that stores the pixel data in response to a write control signal from a control logic, the triple line buffer operating as a circular buffer; and
a resizer core comprising a pixel synchronizer logic that synchronizes an output of the triple line buffer between a plurality of rescaler engines, the plurality of rescaler engines reading pixel data from the triple line buffer in response to a read control signal from the control logic, the pixel data being replicated to resize the image, wherein each of the rescaler engine comprises horizontal and vertical resize ratios as at least one of an integer and a fraction, and the resize ratios being irrespective of each other.

16. The image processing system of claim 15, wherein the plurality of rescaler engines comprises two rescaler engines.

17. The image processing system of claim 16, wherein a maximum input data rate is determined by a slower rescaler engine of the two rescaler engines.

18. The image processing system of claim 16, wherein the slower rescaler engine stalls a faster rescaler engine of the two rescaler engines such that inputs to the rescaler engines are synchronized with each other.

19. The image processing system of claim 15 further comprising a de-multiplexer that receives the write control signal and pixel data, and that generates a de-multiplexer output which is provided selectively to each line buffer of the triple line buffer.

20. The image processing system of claim 15 further comprising a multiplexer that receives a buffer output of the triple line buffer and the read control signal, and that generates a multiplexer output which is provided to the resizer engine.

21. A method for up-scaling an image vertically, the method being implemented in an image processing system, the method comprising:
receiving pixel data representative of an image;
storing the pixel data in response to a write control signal from a control logic in a triple line buffer, the triple line buffer operating as a circular buffer, wherein storing comprises:
    storing the pixel data into one of the line buffers of the triple line buffer starting from the first location to the last location;
    storing the pixel data in a subsequent line buffer in a cyclic fashion; and
    storing comprises storing the pixel data in response to a write row control signal and a write column control signal; and
reading pixel data from the triple line buffer in response to a read control signal from the control logic, the pixel data being replicated to up-scale the image vertically according to a vertical up-scale ratio, the vertical up-scale ratio being a fraction, such that the resizer achieves a maximum input data rate and also eliminates an overflow condition in the resizer.

22. The method of claim 21, wherein reading comprises:
reading the pixel data from the line buffer in which pixel data is previously stored; and
reading from a subsequent line buffer in a cyclic fashion.

23. The method of claim 22, wherein reading comprises reading the pixel data in response to a read row control signal and a read column control signal.

* * * * *